(12) United States Patent
Kogo et al.

(10) Patent No.: US 7,907,318 B2
(45) Date of Patent: Mar. 15, 2011

(54) SCANNING OPTICAL SYSTEM, OPTICAL SCANNING APPARATUS AND IMAGE FORMING APPARATUS

(75) Inventors: Shoji Kogo, Hino (JP); Daisuke Tanahashi, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 449 days.

(21) Appl. No.: 12/217,388

(22) Filed: Jul. 3, 2008

(65) Prior Publication Data

US 2009/0009844 A1 Jan. 8, 2009

(30) Foreign Application Priority Data

Jul. 5, 2007 (JP) ................................. 2007-177161

(51) Int. Cl.
*G02B 26/08* (2006.01)
(52) U.S. Cl. .................................................. 359/216.1
(58) Field of Classification Search ..... 359/196.1–226.3
See application file for complete search history.

(56) References Cited

U.S. PATENT DOCUMENTS

2006/0203318 A1* 9/2006 Yamawaki .................... 359/216

FOREIGN PATENT DOCUMENTS

| JP | 2004-294887 | 10/2004 |
|----|-------------|---------|
| JP | 2006-337916 | 12/2006 |

* cited by examiner

*Primary Examiner* — Stephone B Allen
*Assistant Examiner* — Jennifer L. Doak
(74) *Attorney, Agent, or Firm* — Cohen Pontani Lieberman & Pavane LLP

(57) ABSTRACT

A scanning optical system includes: a light source for emitting a light flux with a wavelength $\lambda$; a polygon mirror comprising a plurality of reflection surfaces for deflecting the light flux emitted from the light source for scanning the scanning surface; a light-converging lens group in a two-element structure. The light-converging lens group is arranged between the polygon mirror and the scanning surface and forms a light spot on the scanning surface. In the scanning optical system, the wavelength $\lambda$ is not larger than 600 nm, and the scanning optical system satisfies a conditional expression relating to a number of the reflection surfaces of the polygon mirror, a scanning width of the scanning optical system, and a focal length of the light-converging lens group in a main scanning direction.

8 Claims, 4 Drawing Sheets

SCANNING OPTICAL SYSTEM, OPTICAL SCANNING APPARATUS AND IMAGE FORMING APPARATUS

This application is based on Japanese Patent Application No. 2007-177161 filed on Jul. 5, 2007, in Japanese Patent Office, the entire content of which is hereby incorporated by reference.

TECHNICAL FIELD

The present invention relates to a scanning optical system employing a polygon mirror, to an optical scanning apparatus, and to an image forming apparatus having therein the optical scanning apparatus, each used in an imaging apparatus such as a laser beam printer.

BACKGROUND

In a conventional laser beam printer, writing has been carried out by using an optical scanning apparatus having a scanning optical system that scans a scanning surface by deflecting a light flux emitted from a semiconductor laser with a polygon mirror that rotates at constant speed, and by converging the light flux on the scanning surface.

As the scanning optical system of this kind, there is known a scanning optical system employing a light source whose wavelength $\lambda$ is 780 nm and a polygon mirror having six surfaces, as disclosed, for example, in Unexamined Japanese Patent Application Publication (JP-A) No. 2006-337916.

In recent years, a laser beam printer providing higher speed of printing and higher definition of printing is demanded.

For attaining this higher speed, it is considered increasing the number of reflection surfaces of the polygon mirror and increasing writing frequencies per one revolution of the polygon mirror. For attaining this higher definition of printing, it is considered decreasing a beam diameter on the scanning surface which corresponds to an image surface.

On the other hand, there is a following relationship in the scanning optical system, where $\Phi$ represents a beam diameter in the main scanning direction on the scanning surface corresponding to an image surface, $\lambda$ represents a wavelength of a light source, f represents a focal length in the main scanning direction of an image-forming lens group arranged between the polygon mirror and the scanning surface, and G represents a diameter in the main scanning direction of a light flux entering the image-forming lens group.

$$\Phi = C \times \lambda \times f / G \quad (6)$$

In the expression, C is a constant of proportionality.

Further, there is a following relationship in the scanning optical system, where $\theta$ represents an angle formed by a light flux reflected by the polygon mirror and an optical axis of the image-forming lens group, and Y represents a distance from the point of intersection of the scanning surface with the optical axis of the image-forming lens group to a beam on the scanning surface.

$$Y = f \times \theta \quad (7)$$

If the number of reflection surfaces of the polygon mirror is increased simply, the maximum angle of scanning per one reflection surface becomes smaller. Namely, the maximum value of the angle $\theta$ becomes smaller, and it is necessary to set focal length f of image-forming lens group to be larger from expression (7), for securing the same scanning width. Therefore, the scanning optical system is made to be greater, which is a problem.

If focal length f grows further greater, there occurs a problem that beam diameter $\Phi$ becomes greater due to the expression (6), and higher definition of printing becomes more difficult. If diameter G of a light flux in the main scanning direction entering the image-forming lens group is established to be great, for making beam diameter $\Phi$ to be small, there are caused problems of a side increase of the polygon mirror, a cost increase of a polygon mirror, and of a cost increase caused by a use of a motor that withstands a load including a mass increase of the polygon mirror.

In the scanning optical system of JP-A No. 2006-337916, a light flux with wavelength of 780 nm is used, the number of reflection surfaces of a polygon mirror is 6 and a focal length of an image-forming lens is 150 mm. When a scanning width in the direction of a short side of A4-sized sheet is 236 mm in the scanning optical system, an angle for one reflection surface of the polygon mirror to incline a light flux is 45.1°, and the number of reflection surfaces that can be formed on the polygon mirror is 7 at the maximum. Further, if the number of reflection surfaces is increased by causing a focal length of the image-forming lens group to be greater than 150 mm, there is a problem that a circumscribed-circle diameter of the polygon mirror grows greater.

Namely, it has been difficult to attain low cost, high speed printing and high definition of printing, when the polygon mirror having the increased number of reflection surfaces is used.

SUMMARY

In view of the aforesaid problems, an objective of the invention is to provide a scanning optical system, an optical scanning apparatus, and an image forming apparatus each attaining high speed printing and high definition of printing in spite of a small size and low cost.

A scanning optical system relating to the present invention is a scanning optical system which scans a scanning surface, and includes a light source for emitting a light flux with a wavelength $\lambda$; a polygon mirror comprising a plurality of reflection surfaces for deflecting the light flux emitted from the light source to scan the scanning surface; and an image-forming lens group in a two-element structure. The image-forming lens group is arranged between the polygon mirror and the scanning surface and forms a light spot on the scanning surface. In the scanning optical system, the wavelength $\lambda$ is not larger than 600 nm, and the scanning optical system satisfies a predetermined condition of the number of the reflection surfaces of the polygon mirror, a scanning width of the scanning optical system, and a focal length of the image-forming lens group in a main scanning direction of the scanning optical system.

These and other objects, features and advantages according to the present invention will become more apparent upon reading of the following detailed description along with the accompanied drawings.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which:

Each of FIGS. 1(a) and 1(b) is a schematic diagram showing the structure of a scanning optical system relating to the present embodiment;

Figure 2:
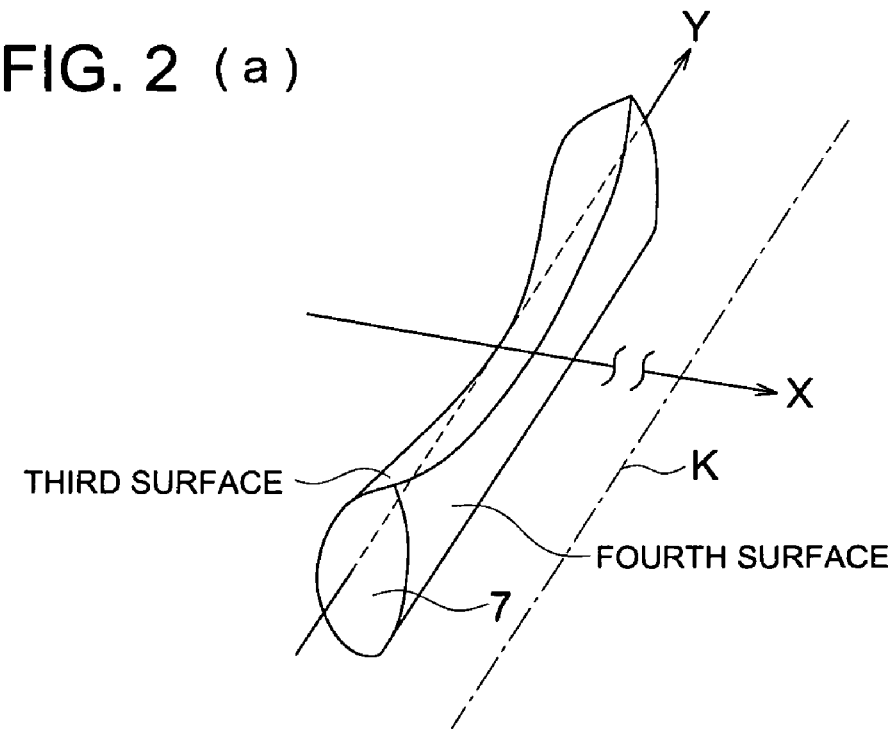
Figure 2:
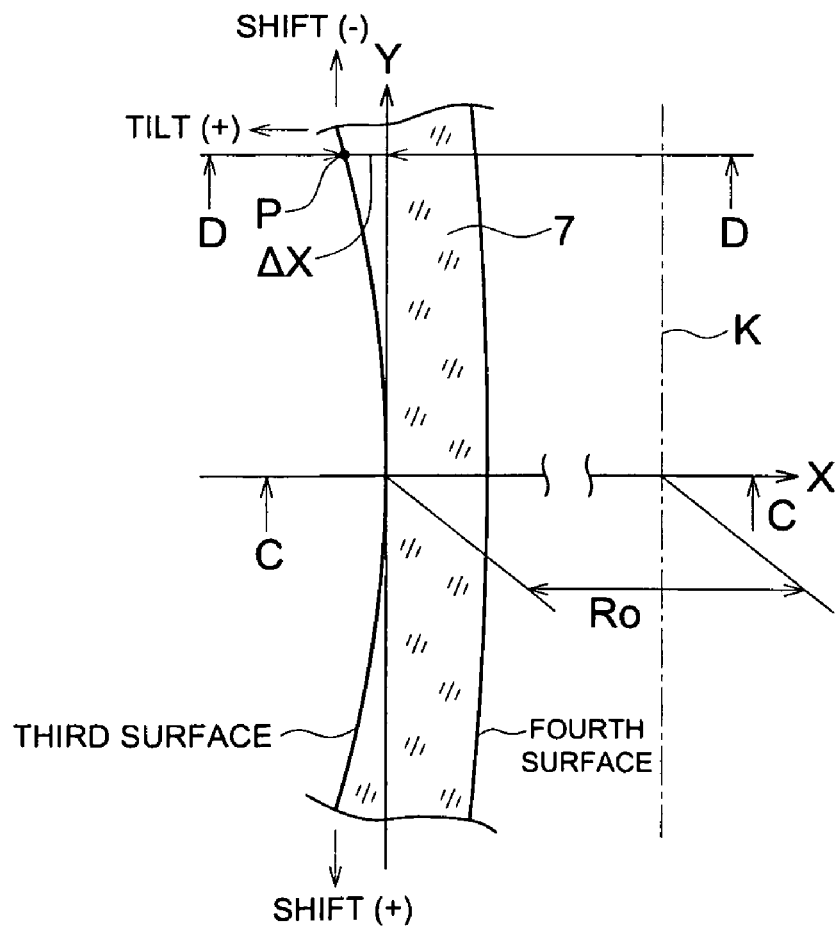
Figure 3:
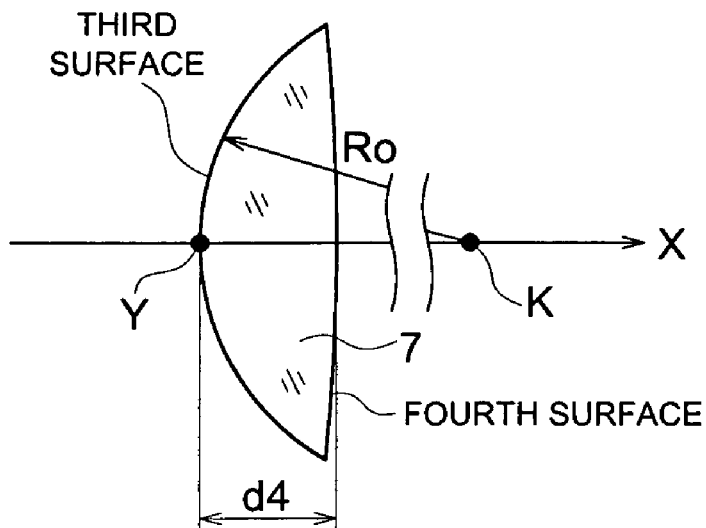
Figure 3:
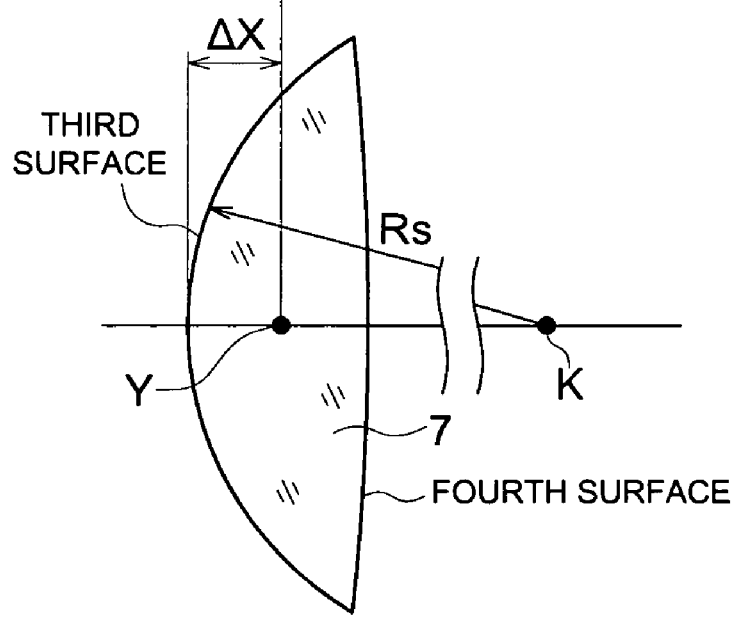
Figure 4:
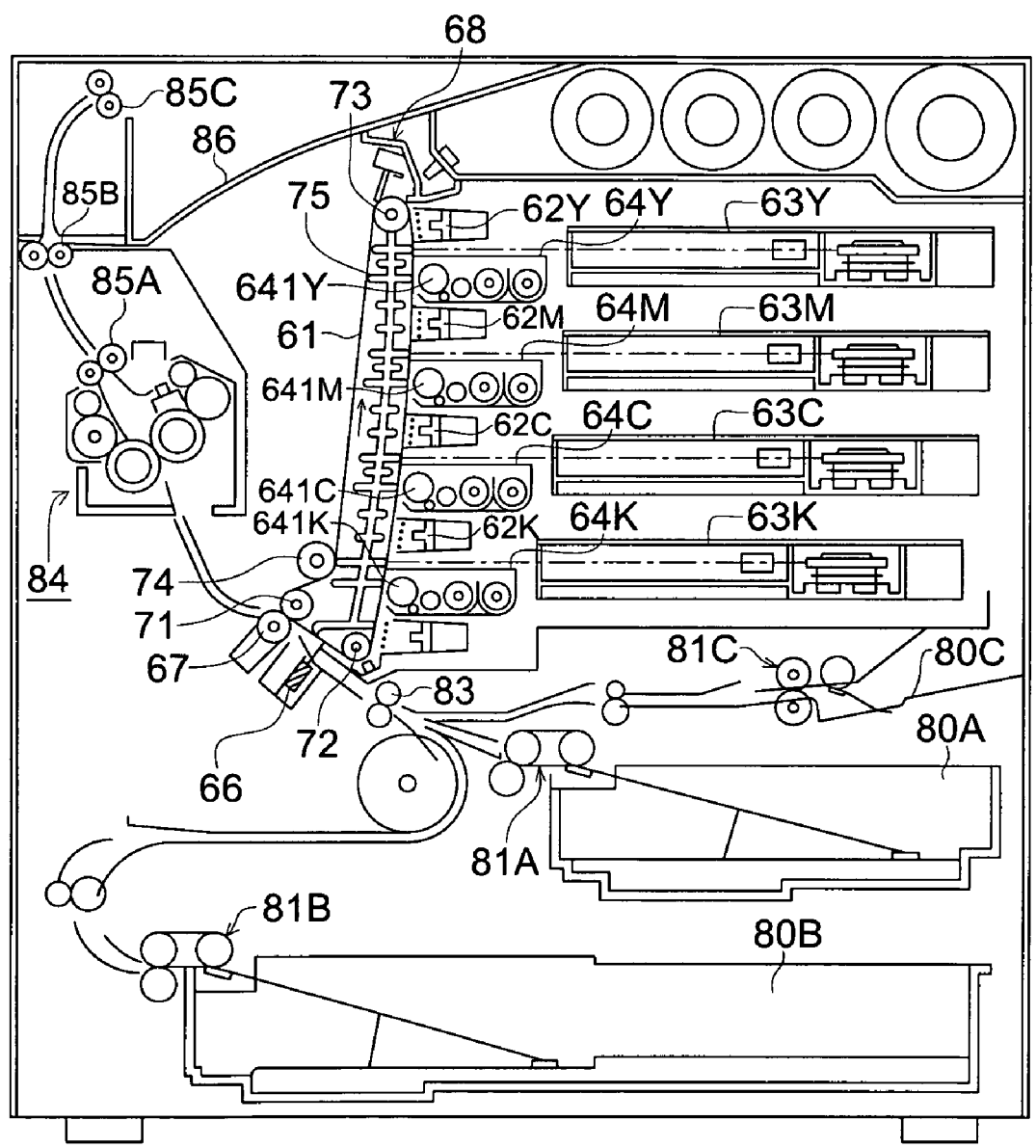

Each of FIGS. 2(a) and 2(b) is a diagram showing a shape of the second lens schematically;

Each of FIGS. 3(a) and 3(b) is a schematic diagram showing a shape of a section of the second lens that is perpendicular to Y-axis representing a sub scanning direction; and FIG. 4 is a schematic structural diagram of a printer that is an example of an image forming apparatus having an optical scanning device equipped with a scanning optical system relating to the present embodiment.

DESCRIPTION OF THE PREFERRED EMBODIMENT

A preferred embodiment of the invention will be explained as follows.

A scanning optical system representing a preferred embodiment of the invention is a scanning optical system for scanning a scanning surface in a main scanning direction and a sub scanning direction. The scanning optical system includes: a light source for emitting a light flux with a wavelength $\lambda$; a polygon mirror comprising a plurality of reflection surfaces for deflecting the light flux emitted from the light source to scan the scanning surface; and an image-forming lens group in a two-element structure. The image-forming lens group is arranged between the polygon mirror and the scanning surface and forms a light spot on the scanning surface. In the scanning optical system, the wavelength $\lambda$ is not larger than 600 nm, and the scanning optical system satisfies the following expression (1).

$$0.06 \leq (1/N) \times (L/f) \leq 0.11 \tag{1}$$

In the expression (1), N represents the number of reflection surfaces of the polygon mirror, L represents a scanning width of the scanning optical system and f represents a focal length of the image-forming lens group in the main scanning direction.

Expression (1) is a conditional expression for attaining higher speed of printing and lower cost.

If the value of the angle of view for scanning (L/f) is set to be large so that a value of the expression (1) exceeds the lower limit, it is easy to secure a necessary scanning width. Further, if the number of reflection surfaces N of the polygon mirror is made small, it is possible to prevent a scanning width per one reflection surface from growing greater for securing the scanning width, and to make a diameter of the polygon mirror to be small for downsizing a scanning optical system and for restraining cost.

If the number of reflection surfaces N of the polygon mirror is made to be large so that a value of the expression (1) does not exceeds the upper limit, it is easy to attain higher speed of printing because scanning frequencies per one revolution of the polygon mirror is increased. If angle of view (L/f) for scanning is set to be small, it is possible to prevent the number of elements in the image-forming lens groups from increasing for keeping excellent image forming capability. Thereby, it is easy to make the scanning optical system to be compact, and cost can be restrained.

It is preferable that the number N of the reflection surfaces of the polygon mirror satisfies the following expression.

$$8 \leq N \leq 12 \tag{2}$$

Expression (2) is a conditional expression for higher speed of printing.

When the number of reflection surfaces N is set to a value exceeding the lower limit of the aforesaid expression (2), scanning frequency per one revolution of the polygon mirror increases and higher speed of printing is attained easily. When the number of reflection surfaces N is set to a value that is lower than the upper limit of the aforesaid expression (2), angle of view for scanning per one surface of the polygon mirror grows greater. Thereby, it prevents a focal length of the image-forming lens from being long for securing the scanning width, and it is easy to make the scanning optical system to be compact.

It is more preferable that the number of reflection surfaces N of the polygon mirror satisfies the following expression (2').

$$9 \leq N \leq 11 \tag{2'}$$

When the light flux emitted from the light source and an optical axis of the image-forming lens group form an angle $\theta 1$, the angle preferably satisfies the following expression (3).

$$40° \leq \theta 1 \leq 75° \tag{3}$$

The expression (3) mentioned above is a conditional expression for changing the polygon mirror size to smaller.

When the value of $\theta 1$ is greater than the lower limit of the expression (3), it is possible to prevent a light flux emitted from the light source from partially being covered by the scanning optical system, before the light flux arrives at the polygon mirror. When the value of $\theta 1$ is smaller than the upper limit of the expression (3), a polygon mirror size becomes smaller, and the scanning optical system can be made smaller easily.

The polygon mirror has a circumscribed-circle diameter D, and the diameter preferably satisfies the following expression (4).

$$25 \text{ mm} \leq D \leq 50 \text{ mm} \tag{4}$$

The expression (4) mentioned above is a conditional expression for optimizing a size of the polygon mirror.

When the value of D exceeds the lower limit of the expression (4), it is not necessary to lessen the number of reflection surfaces of the polygon mirror for securing an angle of view for scanning per one surface of the polygon mirror, and scanning frequencies per one revolution of a polygon mirror increase. It makes the speed of printing higher easily. When the value of D is smaller than the upper limit of the expression (4), a polygon mirror size becomes smaller, and the scanning optical system can be made smaller easily.

It is more preferable that diameter D is 40 mm or less, and further more preferable that diameter D satisfies 30 mm $\leq D \leq$ 40 mm.

Further, the scanning optical system preferably satisfies the following expression (5).

$$0.70 \leq fb/f \leq 0.90 \tag{5}$$

In the expression (5), fb is a distance between a surface closest to the scanning surface in the image-forming lens group and the scanning surface.

The expression (5) mentioned above is a conditional expression for compactness of a scanning optical system and for higher definition of printing.

When the distance fb is lengthen so the value of the aforesaid expression (5) exceeds the lower limit, the lens closest to the scanning surface becomes more distant from the image surface, and a diameter of the lens closest to the scanning surface in the scanning direction becomes small. Therefore, the scanning optical system can be made compact. When the distance fb is shorten so that the value of the aforesaid expression (5) is lower than the upper limit, an amount of changes in focal point position in the sub scanning direction caused by environmental changes such as temperature rises becomes small, which results in printing with higher definition easily.

It is preferable that a value of fb/f is 0.80 or less.

It is further preferable that at least one lens among the image-forming lens group comprises a material whose saturated moisture absorption is not larger than 0.4%.

For making the image-forming lens group to be compact, it is necessary to arrange two lenses constituting the image-forming lens group to be close to a polygon mirror. Therefore, the distance fb tends to long. On the other hand, the two lenses are to be plastic lenses made of resin, because an aspheric surface and an anamorphic surface are formed on the two lenses. A plastic lens causes a change in a focal point position by a change in the water absorption due to temperature changes, which is a tendency that grows greater when fb becomes longer.

Therefore, by forming at least one lens constituting image-forming lens group with a material whose saturated water absorption is 0.4% or less, it is possible to restrain a change in a focal point position caused by a change in water absorption due to temperature changes, and to allow printing of higher definition, even when the distance fb of the image-forming lens group is long. It is further preferable that saturated water absorption is not larger than 0.01%.

As a material having a saturated water absorption of 0.01% or less, ZEONEX 480, 480R, E48R, 330R and RS820 made by ZEON CORPORATION, for example, can be used.

Further, it is preferable that an optical scanning apparatus employs either one of the aforesaid scanning optical systems, and that an image forming apparatus employs the optical scanning apparatus.

The embodiment of invention makes it possible to provide a scanning optical system, an optical scanning apparatus and an image forming apparatus in each of which a higher speed of printing and a higher definition of printing are attained in spite of its small size and low cost.

The invention will be explained in detail as follows, referring to the embodiment to which, however, the invention is not limited.

Figure 1:
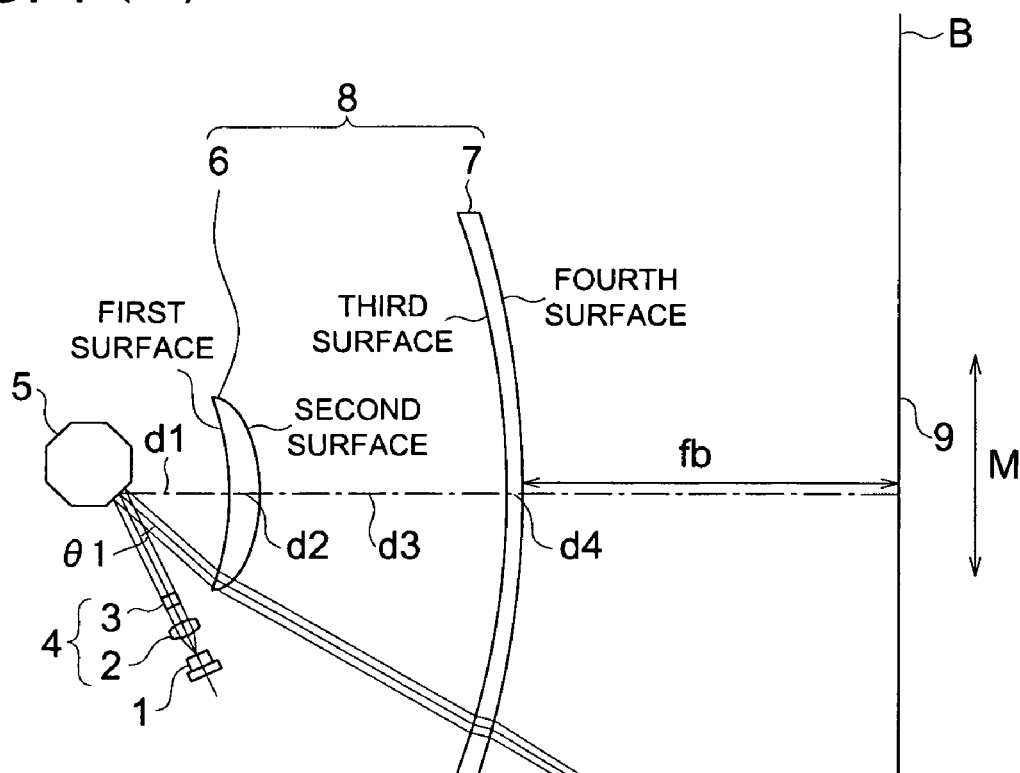
Figure 1:
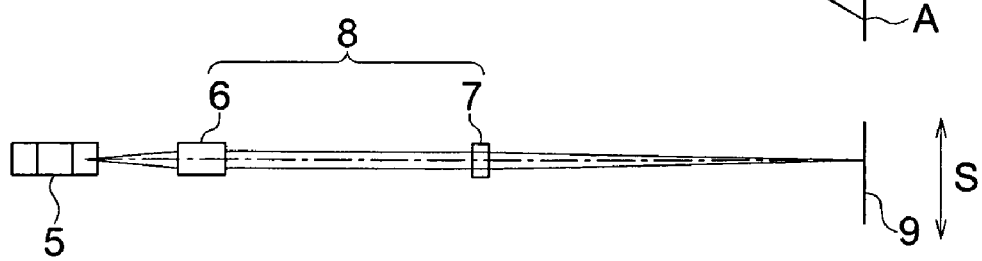

Each of FIGS. 1(a) and 1(b) is a schematic diagram showing the structure of a scanning optical system relating to the present embodiment. FIG. 1(a) is a plan view of the scanning optical system and FIG. 1(b) is a side view of the scanning optical system. Each of the drawings shows a scanning optical system used in a laser beam printer.

Each of the scanning optical systems shown in FIGS. 1(a) and 1(b) is composed of light source 1, optical system 4 having therein collimator lens 2 and cylindrical lens 3, polygon mirror 5, and image-forming lens group 8 in two-element-structure. There is provided scanning surface 9 in each of FIGS. 1(a) and 1(b). In the present specification, explanations will be given under the assumption that a direction of arrow M shown in FIG. 1(a) is a main scanning direction, while, a direction of arrow S shown in FIG. 1(b) is a sub scanning direction.

The light source 1 is a semiconductor laser that emits a light flux having a wavelength of 600 nm or less. The light flux emitted from the light source 1 is caused to be a collimated light flux by collimator lens 2, then, it is converged so that it may become a line that intersects a rotation axis of polygon mirror 5 at right angles in the vicinity of a reflection surface of polygon mirror 5. The converged light flux enters the reflection surface of the polygon mirror 5.

The light beam is reflected on polygon mirror and formed to be a light spot on scanning surface 9 through first lens 6 and second lens 7 constituting image-forming group 8. Further, an area from position A illustrated in FIG. 1(a) to position B illustrated in FIG. 1(a) is scanned by a rotation of the polygon mirror 5. First lens 6 is a meniscus lens having positive power whose concave surface faces the polygon mirror 5, and second lens 7 includes at least one surface formed to be an anamorphic surface.

An explanation will be given as follows, under the assumption that a surface of the first lens 6 constituting image-forming lens group 8 on the polygon mirror 5 side is called the first surface, a surface of the first lens 6 on the second lens 7 side is called the second surface, a surface of the second lens 7 on the first lens 6 side is called the third surface, and a surface of the second lens 7 on the scanning surface 9 side is called the fourth surface.

Each of FIGS. 2(a) and 2(b) is a diagram showing a form of second lens 7 schematically. Each of FIGS. 2(a) and 2(b) is a diagram of the occasion wherein an anamorphic surface is applied on the third surface of the second lens 7. FIG. 2(a) is a perspective view of the second lens 7 and FIG. 2(b) is a cross-sectional view taken on a plane including X-axis and Y-axis shown in FIG. 2(a).

As a reference axis in each of FIGS. 2(a) and 2(b), there is provided the X axis as a line such that a principal ray of a light flux reflected by polygon mirror, in the case of no existence of image-forming lens group 8, is perpendicular to scanning surface 9.

A cross-sectional form of the third surface of the second lens 7 in the main scanning direction including X-axis is expressed by the following expression (8). In this expression, Y axis is an axis that passes through a point of intersection of X-axis and the anamorphic surface, and is in parallel with the main scanning direction, and $\Delta X$ is a shift amount of off-axis point P from Y axis that is away from X-axis by Y as shown in FIG. 2(b).

$$\Delta X = \frac{Y^2/R}{1+\sqrt{1-(K+1)Y^2/R^2}} + \sum_{j=1}^{n} A_j Y^{\alpha j} \qquad (8)$$

Where, R represents a radius of curvature, K represents a conic constant, Aj represents an aspheric surface coefficient and αj represents an aspheric surface order.

With respect to a form of a section of the third surface of the second lens 7 that intersects a Y-axis representing a sub scanning direction at right angles, it is a circular arc having the center positioned on K-axis that extends in parallel with Y-axis and is away from the axis K by $R_0$.

Each of FIGS. 3(a) and 3(b) is a schematic diagram showing a form of a section of the second lens 7 that intersects a Y-axis representing a sub scanning direction at right angles. FIG. 3(a) shows a section taken on line C-C (on X-axis) shown in FIG. 2(b), and FIG. 3(b) shows a section taken on line D-D shown in FIG. 2(b).

The section of the third surface of the second lens 7 shown in FIG. 3(a) is a section extending in the sub scanning direction perpendicular to the Y-axis and including the X-axis. The section is in a form of a circular arc having a radius of $R_0$ and a center positioned on the point on K-axis.

Further, a section of the third surface of the second lens 7 is a section extending in the sub scanning direction perpendicular to the Y-axis and including off-axis point P that is away from X-axis by Y. The section is in a form of a circular arc having a radius of $R_S$ and the center positioned on the point on K-axis, where its radius of curvature is expressed by $R_S = R_0 - \Delta X$.

By making a line of intersection between an anamorphic surface and a main scanning direction to be an appropriate curved form as stated above, it is possible to correct the image plane along the sub scanning direction properly from the center of an image area to the peripheral portions. It is possible to obtain a beam diameter that is uniform on the scanning surface, especially in the sub scanning direction.

Further, the second lens 7 having the aforesaid anamorphic surface may also be arranged such that the second lens 7 is shifted or tilted, or subjected to both shifting and tilting, for X-axis representing the reference axis.

Incidentally, a form of the anamorphic surface is not limited to the aforesaid form. It can employ a surface on which a radius of curvature in the sub scanning direction can be changed independently of the main scanning direction as it departs from an axis, for example, a free curved surface expressed by a numerical expression described in JP-A No. 2004-294887. Further, it is also possible to apply an anamorphic surface form on the first lens 6 constituting image-forming lens 8.

FIG. 4 is a schematic structural diagram of a printer that is an example of an image forming apparatus having an optical scanning device equipped with a scanning optical system relating to the present embodiment.

The printer shown in FIG. 4 is of the type wherein a color image can be formed, and a writing section and a developing section are provided in each of blue, green, red and black, and four optical scanning apparatuses at writing section are equipped with the scanning optical system relating to the present embodiment.

The printer of the present example is one wherein toner images each being in its each color are formed on respective image carriers in succession are superposed, and then, they are transferred onto a recording sheet at the same time in the transfer section to form a color image.

Plural sets (the illustrated four sets) of image forming units composed of scorotron chargers (hereinafter referred to as chargers) 62Y, 62M, 62C and 62K, optical scanning apparatuses 63Y, 63M, 63C and 63K and developing units 64Y, 64M, 64C and 64K are arranged lengthwise around flexible endless-belt-type photoconductor (hereinafter referred to a photoconductor) 61 representing an image carrier. Inside each of optical scanning apparatuses 63Y, 63M, 63C and 63K, there is arranged respectively a scanning optical system shown in FIGS. 1(*a*) and 1(*b*).

Belt-type photoconductor 61 is trained about driving roller 71 and rotating rollers 72 and 73, and is made to be in a tensile state by tension roller 74, to rotate clockwise as illustrated, while being caused to touch locally by back-up member 75 provided on an inner circumferential surface. The back-up member 75 comes in contact with a rear surface of belt-type photoconductor 61, and it regulates developing zones of developer carriers (hereinafter referred to as a developing sleeve) 641 (Y, M, C and K) and image forming positions of optical scanning apparatuses 63 (Y, M, C and K).

With a start of image recording, driving motor rotates, and belt-type photoconductor 61 rotates clockwise as illustrated through driving roller 71, and investing of potential to belt-type photoconductor 61 is started by charging action of charger 62Y. After potential is invested to belt-type photoconductor 61, exposure by electric signal corresponding to image signal of the first color signal, namely, yellow (Y) is started, and rotation (sub scanning) of belt-type photoconductor 61 forms an electrostatic latent image corresponding to an image of yellow (Y) developed on a lightsensitive layer. This latent image is subjected to reversal development by developing unit 64Y under the non-contact state for developer that is stuck on developing sleeve 641Y representing developer carrier and conveyed, and a toner image for yellow (Y) is formed corresponding to rotation of belt-type photoconductor 1.

Next, on the belt-type photoconductor 61, electric potential is applied on a toner image in yellow (Y) color by further actions of charging by charger 62M, then, exposure by electric signals corresponding to second signals of optical scanning apparatus 63M, namely, to image signals of magenta (M) is given to the toner image, thus, a toner image in magenta (M) is formed to be superposed on the aforesaid yellow (Y) toner image through non-contact reversal development by developing unit 64M.

In the same process, a toner image in a cyan (C) color corresponding to the third color signals is further formed by charger 62C, optical scanning apparatus 63C and developing unit 64C. Further, a toner image in a black (K) color corresponding to the fourth color signals is successively formed by charger 62K, optical scanning apparatus 63K and developing unit 64K, thus, a color toner image is formed on the circumferential surface of the belt-type photoconductor 61 within one turn thereof.

In the case of developing operations by developing units 64Y, 64M, 64C and 64K, DC bias having the same polarity as charging of the belt-type photoconductor 61, or developing bias wherein AC bias is added to DC bias, is impressed on each of developing sleeves 641Y, 641M, 641C and 641K, and non-contact reversal development by two-component developer sticking on each of developing sleeves 641 (Y, M, C and K) is carried out to cause toner to stick on an exposure section on the belt-type photoconductor 61 whose conductive layer is grounded.

Thus, the color toner image formed on the circumferential surface of the belt-type photoconductor 61 is subjected to neutralizing by a pre-transfer exposure device after the potential of toner sticking to the toner image is uniformed by a charger, and at the transfer section, the color toner image is transferred by transfer device (transfer roller) 67 arranged to face a lower portion of drive roller 71 that drives the belt-type photoconductor 61 onto a transfer sheet that is fed out by each of sheet feeding devices 81A, 81B and 81C from each of sheet feed cassettes 80A, 80B or hand feeding section 80C representing a sheet feed device, to be conveyed to paired registration rollers 83 and is fed in synchronizing with a toner image area on the belt-type photoconductor 61 by driving of the paired registration rollers 83.

Photo-sensor 66 is arranged at the prescribed position that faces belt-type photoconductor 61 trained about drive roller 71 and rotating rollers 72 at the middle between the paired registration rollers 83 and the transfer rollers 67. The photo-sensor 66 is one to detect a joint of the belt-type photoconductor 61 and a registration mark formed on the belt-type photoconductor 61, and it is a sensor composed of one set of a light-emitting section and a light-receiving section.

A transfer material (transfer sheet) onto which a toner image has been transferred is conveyed to fixing device 84 after being separated from a circumferential surface of belt-type photoconductor 61 that follows a curvature of drive roller 71, and in fixing device 84, toner is heated and pressed to be deposited and fixed, and the transfer sheet is ejected from fixing device 84 to be conveyed by sheet ejection rollers 85A, 85B and 85C, and is ejected to sheet-ejection tray 86 provided at the upper portion, with a toner image surface on the transfer sheet facing downward.

FIG. 4 shows the printer including an image carrier which is one belt-type photoconductor 61. However, it is also possible to provide four photoconductor drums corresponding respectively to respective colors.

Next, an example of a scanning optical system relating to the invention will be shown.

A form of an aspheric surface used in the example is expressed by the following expression (9), where a vertex of the surface is caused to be the origin, and an X-axis extends along the optical axis, an h represents a height in the direction perpendicular to the optical axis.

$$x = \frac{h^2/R}{1 + \sqrt{1 - (K+1)h^2/R^2}} + A_4 h^4 + A_6 h^6 + A_8 h^8 + A_{10} h^{10} + A_{12} h^{12} \quad (9)$$

In the expression (9), K represents a conic constant and each of $A_4, A_6, A_8, A_{10}$ and $A_{12}$ represents an aspheric surface coefficient.

Further, an exponent for 10 is expressed by E. For example, $2.5 \times 10^{-02}$ is expressed as 2.5E-02.

EXAMPLES

In the examples shown below, reflection surfaces of polygon mirror 5 and scanning surface 9 are almost conjugate on a geometric optics basis concerning sub scanning direction.

Example 1

Table 1 shows various data of scanning optical system and surface data of image-forming lens group 8 relating to Example 1.

In the data, a distance fb along the optical axis between the surface closest to the scanning surface in the image-forming lens group and the scanning surface is described as a back focus of the image-forming lens group. Further, incident angle to polygon mirror $\theta 1$ is an angle formed by the X-axis and an optical axis of an optical system arranged between a light source and a polygon mirror.

TABLE 1

Number of surfaces of polygon mirror: N = 10
Circumscribed-circle diameter of polygon mirror: D = 37.5 mm
Working wavelength: $\lambda$ = 405 nm
Incident angle to polygon mirror: $\theta 1$ = 50°
Focal length of image-forming lens in main scanning direction: f = 320 mm
Back focus of image-forming lens group: fb = 238 mm

| Surface No. | R(mm) | d(mm) | $n_{405}$ |
|---|---|---|---|
| (Reference deflecting point) | | 40 | |
| 1 | −54.16449 | 10 | 1.52524 |
| 2 | −42.34767 | 89 | |
| 3 (Main) | −253.53 | 6 | 1.52524 |
| (3 (Sub) | 57.429) | | |
| 4 | −329.86227 | | |

The first surface is a rotational symmetrical spherical surface. The second and fourth surfaces represent a rotational symmetrical aspheric surface. The third surface is an anamorphic surface. Surface data in the main scanning direction of the third surface is represented by "3 (Main)" in Table 1. As shown in Table 1, a value of curvature radius $R_0$ of the third surface (see FIG. 2(b)) in the sub scanning direction is 57.429 mm around the optical axis.

The Table 1 shows refractive index $n_{405}$ for wavelength $\lambda$ of 405 nm. The reference deflecting point means a point where a reflection surface of the polygon mirror intersects a principal ray under the condition that an incident angle to polygon is $\theta 1$.

Aspheric surface data of Example 1 will be shown in Table 2.

TABLE 2

Second surface

K = −2.35857E−01
A4 = 1.61647E−07
A6 = 9.41594E−11
A8 = −1.30220E−13
A10 = 1.62995E−16
A12 = 0

Third surface (main scanning direction)

K = 0
A4 = 3.8707E−08
A6 = −5.1302E−12
A8 = 3.1636E−15
A10 = 6.1516E−19
A12 = −4.5659E−22

Fourth surface

K = 2.4952323E+01
A4 = −1.37010E−08
A6 = 9.46146E−12
A8 = 6.06087E−15
A10 = −4.55909E−19
A12 = 0

In Example 1, second lens 7 of image-forming lens group in the aforesaid surface data is shifted first by 0.06 mm in the direction shown in FIG. 2(b), and then, is tilted by on the center of the point on the Y-axis where a section in the sub scanning direction has a radius $R_0$.

Example 2

Table 3 shows various data of scanning optical system and surface data of image-forming lens group 8 relating to Example 2.

In the data, a distance fb along the optical axis between the surface closest to the scanning surface in the image-forming lens group and the scanning surface is described as a back focus of the image-forming lens group. Further, incident angle to polygon mirror $\theta 1$ is an angle formed by the X-axis and an optical axis of an optical system arranged between a light source and a polygon mirror.

TABLE 3

Number of surfaces of polygon mirror: N = 9
Circumscribed-circle diameter of polygon mirror: D = 32.2 mm
Working wavelength: $\lambda$ = 405 nm
Incident angle to polygon mirror: $\theta 1$ = 50°
Focal length of image-forming lens in main scanning direction: f = 280 mm
Back focus of image-forming lens group: fb = 205 mm

| Surface No. | R(mm) | d(mm) | $n_{405}$ |
|---|---|---|---|
| (Reference deflecting point) | | 40 | |
| 1 | −61.69518 | 10 | 1.52524 |
| 2 | −43.24896 | 74 | |
| 3 (Main) | −131.74 | 6 | 1.52524 |
| (3 (Sub) | 58.090) | | |
| 4 | −174.89728 | | |

The first surface is a rotational symmetrical spherical surface. The second and fourth surfaces represent a rotational symmetrical aspheric surface. The third surface is an anamorphic surface. Surface data in the main scanning direction of the third surface is represented by "3 (Main)" in Table 3. As shown in Table 3, a value of curvature radius $R_0$ of the third surface (see FIG. 2(b)) in the sub scanning direction is 58.090 mm around the optical axis.

The Table 3 shows refractive index $n_{405}$ for wavelength λ of 405 nm. The reference deflecting point means a point where a reflection surface of the polygon mirror intersects a principal ray under the condition that an incident angle to polygon is θ1.

Aspheric surface data of Example 1 will be shown in Table 4.

TABLE 4

Second surface

K = −4.17275E−01
A4 = −8.33079E−08
A6 = 4.33600E−11
A8 = −1.32606E−13
A10 = 6.80507E−17
A12 = 0
Third surface (main scanning direction)

K = 0
A4 = −1.5126E−07
A6 = −1.3405E−11
A8 = −1.4768E−15
A10 = −3.3985E−18
A12 = 2.1401E−22
Fourth surface K = 1.340005E+00
A4 = −2.96845E−07
A6 = −3.81517E−12
A8 = −3.01010E−15
A10 = −1.63169E−18
A12 = 0

In Example 2, second lens 7 of image-forming lens group 8 in the aforesaid surface data is shifted first by 0.23 mm in the direction shown in FIG. 2(b), and then, is tilted by 0.63° on the center of the point on the Y-axis where a section in the sub scanning direction has a radius $R_0$.

Example 3

Table 5 shows various data of scanning optical system and surface data of image-forming lens group 8 relating to Example 3.

In the data, a distance fb along the optical axis between the surface closest to the scanning surface in the image-forming lens group and the scanning surface is described as a back focus of the image-forming lens group. Further, incident angle to polygon mirror θ1 is an angle formed by the X-axis and an optical axis of an optical system arranged between a light source and a polygon mirror.

TABLE 5

Number of surfaces of polygon mirror: N = 9
Circumscribed-circle diameter of polygon mirror: D = 32.2 mm
Working wavelength: λ = 405 nm
Incident angle to polygon mirror: θ1 = 50°
Focal length of image-forming lens in main scanning direction: f = 260 mm
Back focus of image-forming lens group: fb = 190 mm

| Surface No. | R(mm) | d(mm) | $n_{405}$ |
|---|---|---|---|
| (Reference deflecting point) | | 38 | |
| 1 | −61.10173 | 10 | 1.52524 |

TABLE 5-continued

Number of surfaces of polygon mirror: N = 9
Circumscribed-circle diameter of polygon mirror: D = 32.2 mm
Working wavelength: λ = 405 nm
Incident angle to polygon mirror: θ1 = 50°
Focal length of image-forming lens in main scanning direction: f = 260 mm
Back focus of image-forming lens group: fb = 190 mm

| Surface No. | R(mm) | d(mm) | $n_{405}$ |
|---|---|---|---|
| 2 | −41.90242 | 68.6 | |
| 3 (Main) | −124.74 | 6 | 1.52524 |
| (3 (Sub) | 54.233) | | |
| 4 | −166.80807 | | |

The first surface is a rotational symmetrical spherical surface. The second and fourth surfaces represent a rotational symmetrical aspheric surface. The third surface is an anamorphic surface. Surface data in the main scanning direction of the third surface is represented by "3 (Main)" in Table 1. As shown in Table 5, a value of curvature radius $R_0$ of the third surface (see FIG. 2(b)) in the sub scanning direction is 54.233 mm around the optical axis.

The Table 5 shows refractive index $n_{405}$ for wavelength λ of 405 nm. The reference deflecting point means a point where a reflection surface of the polygon mirror intersects a principal ray under the condition that an incident angle to polygon is θ1.

Aspheric surface data of Example 3 will be shown in Table 6.

TABLE 6

Second surface

K = −4.45951E−01
A4 = −0.941536E−07
A6 = −0.891875E−10
A8 = 0.537571E−13
A10 = −0.518277E−16
Third surface (main scanning direction)

K = 0
A4 = −1.4851E−07
A6 = −7.3914E−11
A8 = 2.5220E−14
A10 = −1.0138E−17
A12 = 3.9359E−22
Fourth surface K = 0.1671964E+01
A4 = −0.324332E−06
A6 = −0.405314E−10
A8 = 0.120514E−13
A10 = −0.507574E−17
A12 = 0

In Example 3, second lens 7 of image-forming lens group in the aforesaid surface data is shifted first by 0.27 mm in the direction shown in FIG. 2(b), and then, is tilted by 0.75° on the center of the point on the Y-axis where a section in the sub scanning direction has a radius $R_0$.

Values of $(1/N) \times (L/f)$ of the aforesaid expression (1) in image-forming lens groups in Examples 1 to 3 are calculated as follows.

In Example 1, $(1/N) \times (L/f)$ is calculated from the parameters N=10 and f=320 mm for L=236 mm:

$(1/N) \times (L/f)$ is 0.07375.

Further, $(1/N) \times (L/f)$ is calculated from the parameters N=10 and f=320 mm for L=220 mm:

$(1/N) \times (L/f)$ is 0.06875.

In Example 2, (1/N)×(L/f) is calculated from the parameters N=9 and f=280 mm for L=236 mm:

(1/N)×(L/f) is 0.09365.

Further, (1/N)×(L/f) is calculated from the parameters N=9 and f=280 mm for L=220 mm:

(1/N)×(L/f) is 0.08730.

In Example 3, (1/N)×(L/f) is calculated from the parameters N=9 and f=260 mm for L=236 mm:

(1/N)×(L/f) is 0.10085.

Further, (1/N)×(L/f) is calculated from the parameters N=9 and f=260 mm for L=220 mm:

(1/N)×(L/f) is 0.09402.

As explained above, by using a light source whose working wavelength is as short as 600 nm or less and by satisfying the expression (1), it is possible to make a beam diameter in the main scanning direction on the image surface to be smaller, without making a light flux diameter in the main scanning direction to be smaller or without changing it, even when a focal length of the image-forming lens group becomes longer. Further, it is possible to increase the number of reflection surfaces without making a polygon mirror size to be larger. Thus, it is possible to obtain a scanning optical system in which a higher speed of printing and a higher definition of printing are attained in spite of a small size and low cost of the scanning optical system.

It is further possible to obtain an image forming apparatus wherein a higher speed of printing and a higher definition of printing are compatible with each other in spite of a small size and low cost of the image forming apparatus, when it has therein an optical scanning apparatus equipped with the aforesaid scanning optical system.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A scanning optical system for scanning a scanning surface in a main scanning direction and a sub scanning direction, the scanning optical system comprising:

a light source for emitting a light flux with a wavelength $\lambda$ which is not larger than 600 nm;

a polygon mirror comprising a plurality of reflection surfaces for deflecting the light flux emitted from the light source to scan the scanning surface; and an image-forming lens group in a two-element structure, arranged between the polygon mirror and the scanning surface and forming a light spot on the scanning surface, wherein the scanning optical system satisfies a following expression:

$$0.06 \leq (1/N) \times (L/f) \leq 0.11,$$

where N is a number of the reflection surfaces of the polygon mirror,

L is a scanning width of the scanning optical system, and f is a focal length of the image-forming lens group in the main scanning direction.

2. The scanning optical system of claim 1, wherein the number of the reflection surfaces of the polygon mirror satisfies $8 \leq N \leq 12$.

3. The scanning optical system of claim 1, wherein the light flux emitted from the light source and an optical axis of the image-forming lens group form an angle $\theta 1$, and the angle satisfies $40° \leq \theta 1 \leq 75°$.

4. The scanning optical system of claim 1, wherein the polygon mirror has a circumscribed-circle diameter D satisfying 25 mm $\leq$ D $\leq$ 50 mm.

5. The scanning optical system of claim 1, wherein the scanning optical system satisfies a following expression:

$$0.70 \leq fb/f \leq 0.90,$$

where fb is a distance between a surface closest to the scanning surface in the image-forming lens group and the scanning surface.

6. The scanning optical system of claim 1, wherein at least one lens of the image-forming lens group comprises a material whose saturated moisture absorption is not larger than 0.4%.

7. An optical scanning apparatus comprising:
the scanning optical system of claim 1.

8. An image forming apparatus comprising:
the optical scanning apparatus of claim 7.

* * * * *